United States Patent [19]
Ryder

[11] 3,893,082
[45] July 1, 1975

[54] AUTOMATIC MATRIX CONTROL SYSTEM

[75] Inventor: Anthony David Ryder, Bolton, England

[73] Assignee: Thomas Ryder & Son Limited, Bolton, England

[22] Filed: Dec. 18, 1973

[21] Appl. No.: 425,903

[30] Foreign Application Priority Data
Dec. 28, 1972  United Kingdom............. 59860/72

[52] U.S. Cl. ........................ 340/166 R; 340/167 R
[51] Int. Cl. ........................................... H04q 9/00
[58] Field of Search......... 340/166 R; 235/152, 156, 235/197; 179/18 GE, 18 GF

[56] References Cited
UNITED STATES PATENTS

| | | | |
|---|---|---|---|
| 2,976,520 | 3/1961 | Reenstra | 340/166 R |
| 3,097,307 | 7/1963 | Bonn | 340/166 R |
| 3,624,610 | 11/1971 | Warring | 340/166 R |
| 3,805,037 | 4/1974 | Ellison | 340/166 R |

*Primary Examiner*—Harold I. Pitts
*Attorney, Agent, or Firm*—Sughrue, Rothwell, Mion, Zinn & Macpeak

[57] ABSTRACT

An automatic control system providing a versatile programmable unit for controlling for example machine tools, comprising means for realising a set of Boolean relationships, in electrical form, between input and output signals, means for presenting input conditions in electrical form, and means for converting the output signals into mechanical or other required form. The realising means include a bus-bar lattice or matrix arrangement wherein selected point connections across a lattice or matrix for programming purposes are made by means of uni-directional conduction devices.

12 Claims, 9 Drawing Figures

AUTOMATIC MATRIX CONTROL SYSTEM

BACKGROUND OF THE INVENTION

This invention relates particularly to automatic control systems of the sequential type.

Sequential control systems for machines or systems are required to generate a sequence of output signals in response, to input signals, some of which may result from instructions given to the control system and some of which may indicate the current state of the machine or system. In the control of machine tools, for example, input signals of the first type are commonly-derived from switches or push-buttons whilst signals of the second type are obtained from limit switches. The output signals are used, after amplification if necessary to operate relays, contactors, valves, etc. which control the operation of the machine. All the devices involved in sequential control systems are essentially two-state, on-off devices and the input and output signals are combinations of binary digits, each indicating the actual or desired state of a particular input or output device.

Control systems for a specific purpose have been constructed from relays and many of these relay systems have been translated into solid-state equivalents for compactness and reliability, but a simple translation still leaves the controller specific to a particular machine; its working can be changed only by physical re-arrangement and re-wiring.

Where the logic of operation is complex, a computer may be used together with its associated memory. Such an arrangement provides the flexibility of operation lacking in the relay simple systems but is expensive and is not warranted unless the logic is complex.

An object of the present invention is to provide a relatively simple and versatile automatic control system.

According to the invention, an automatic control system comprises means for realising a set of Boolean relationships, in electrical form, between input and output signals, means for presenting input conditions in electrical form, means for converting the output signals into mechanical or other required form, the realising means including a bus-bar lattice or matrix arrangement wherein selected point connections across a lattice or matrix for programming purposes are made by means of uni-directional conduction devices.

Preferably the uni-directional conduction devices are diodes which also perform logic functions.

A control system in accordance with the invention can be designed as a relatively low-cost programmable unit to replace any normal relay system, especially where the complexity of the logic does not warrant the use of a computer. A standard off-the-shelf unit can be set up to control any machine within its capacity, not by physical modification, but by a "soft-ware" programming process. This standardisation can result in shorter lead times, less engineering time per machine controlled, reduction of spares stocked and simplification and speed up of maintenance and fault finding. The system may be programmed and re-programmed readily when required or if desired the control unit may be used to control a different machine.

Conveniently the arrangement comprises two principal sections; an input and an output section, and each section includes a programmable diode matrix. The input sections ANDs selected input signals to provide intermediate signals which are ORed in the output section to produce the output signals.

For example means may be provided in accordance with the invention for realising, in terms of electrical signals, the following set of logical relationships of the Boolean form $$R = Q_1 + Q_3 \ldots Q_m$$

i.e. an OR of m terms, where each term $Q$ is itself an AND combination of a number of components, so that $$Q = P_1 \cdot P_2 \cdot P_3 \ldots P_n$$

R is an output signal of the system, and each P component is an input signal.

A system in accordance with the invention may be arranged with $x$ input channels (P), $y$ AND-combinations (Q) and $z$ output channels (R), where $x$, $y$ and $z$ may be independently selected as desired.

Such a means may enable a standardised unit, with a given capacity in terms of $x$, $y$ and $z$, to be readily set up or programmed for any set of logical relationships within its capacity, without the need for physically changing its internal wiring. Each term $Q$ may be an AND of any combination of inputs $P$, and each output $R$ may be an OR of any combination of ANDs $Q$. Moreover an output signal if required, may be used as an input to make further combinations, or to provide a latching function analogous to the use of a maintaining contact on a relay.

Together with known means of presenting input signals in electrical form, and of using or amplifying electrical output signals to control mechanical motions, etc., a system in accordance with the invention can be used in numerous control functions, for example in the control of machine-tools, conveyors, etc., Conveniently, the system comprises two principal sections, an input section in which the signals P are ANDed to produce the intermediate signals Q, and an output section in which the signals Q are ORed to produce output signals R.

Each section uses a programmable diode matrix, for example a plugboard with horizontal and vertical sets of bus-bars, that is rows and columns arranged one behind the other, in such a way that plug connections may be made at any intersections desired. As is known, by using plugs containing diodes, several rows may feed one column (or vice versa) without establishing a connection between the rows or columns. The operation of inserting plugs at the desired intersections represents the programming of the matrix.

Another means of realising a programmable matrix is to construct a lattice with a pair of diodes back-to-back in series, e.g. with their anodes connected together, at every junction. As built, no current can pass, but any crossing of the lattice may be programmed by applying an excessive voltage, in the desired working direction, and via a current limiting resistor, to the selected H-V junction, causing the diode in a blocking state to breakdown. By suitable choice of materials, voltage and current, the breakdown can be made to result in a permanent short circuit of the previously blocking diode, thus establishing the desired working connection. This realisation is especially suitable for construction by integrated circuit techniques.

BREIF DESCRIPTION OF THE DRAWINGS

Embodiments of the invention will now be described with reference, by way of example, to the accompanying drawings, in which.

DESCRIPTION OF THE PREFERRED EMBODIMENT

Figure 1:
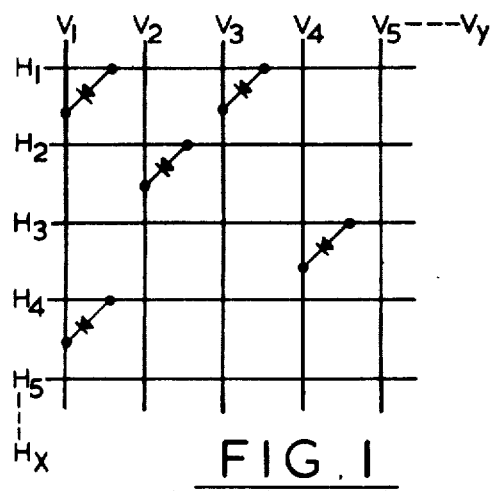
FIG. 1 is a schematic diagram of part of an input section matrix.

FIG. 1 shows part of a matrix, with rows $H_1$, $H_2$, etc, and columns $V_1$, $V_2$, etc. Five of the intersections are programmed with diodes shown with polarity 'row-to-column'. For example rows $H_1$ and $H_4$, feed column $V_1$. This Figure corresponds to the input section matrix.

The rows of the input section matrix are fed from external input signals via suitable interfacing circuits so as to present signals at appropriate logic level. The interface also produces inversion, so that when an input signal $P_r$ is 'true', the corresponding row bus-bar $H_r$ is 'low' in positive logic terms.

Thus a particular column $V_k$ will only be low when all the rows to which it is connected, via diodes, are low, i.e. when all the corresponding inputs P are true, and the signal $V_k$ represents the complemented AND, or NAND, of the inputs P.

To increase the flexibility of the system, it is convenient to provide each input interface (shown as A in FIG. 2) with two external input paths arranged so that the signal H to the bus-bar is the complement of X. $\overline{Y}$; then a signal $V_k$ represents the NAND of a series of such terms P = X. $\overline{Y}$.

Then, if an external switch is connected between an input D.C. supply T and an input X, with no input to input Y, then $P = X$, i.e. P true corresponds to the switch closed. If X is linked to supply T, and the switch taken to Y, then $P = \overline{Y}$, i.e. P true corresponds to the switch open.

Figure 3:
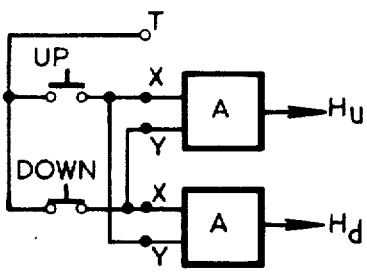
FIG. 3 is a schematic diagram of two input interfaces of the kind shown in FIG. 2 arranged to provide an interlocking feature between two input signals.

In this way logic operations of either sense may be obtained from either 'normally open' or 'normally closed' contacts, as convenient. Also, both X and Y connections may be used, providing cross-interlocking between two external signals without the need to programme such interlocking on the matrix itself. A typical application is the interlocking of Up and Down control buttons, as shown in FIG. 3, to prevent any response if both buttons are operated simultaneously, signals $H_u$ and $H_d$ and the H signals for Up and Down respectively.

As indicated in FIG. 1, the number $x$ of horizontal bus-bars H corresponds to the number of input channels provided, and the number $y$ of vertical bars V to the number of NAND terms allowed for.

To generate the AND signal, an inverter is provided for each signal $V_k$ from a vertical bar, and its output represents $Q_k$, the AND of the P signals selected by programming the $V_k$ column of the input section.

Figure 4:
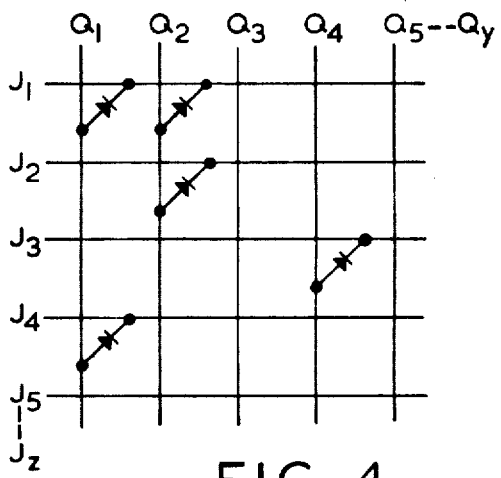
FIG. 4 is a schematic diagram of part of an output section matrix.

The Q signals are taken to one set of bars, conveniently the verticals, of the output section matrix, as shown in FIG. 4, the number of bars required is likewise $y$. In this matrix, as the signals originate from the columns, the diodes have polarity column-to-row, as shown.

If any Q signal is high, it will produce a high on any horizontal bar $J_k$ to which it has a diode connection, irrespective of the state of other Q signals which may be connected to the same J bar. Thus the $J_k$ signals represents the OR of the selected signals Q.

The signals J are thus logically equivalent to the required output signals R, and each J signal is taken to a suitable amplifying and isolating interface to permit its use for control purposes. For example the J signal may be amplified to control a relay, or a solid-state switching device.

Figure 5:
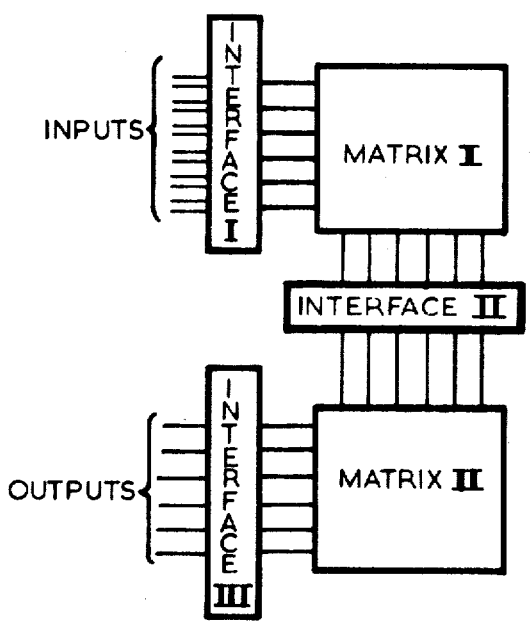
FIG. 5 is a schematic diagram of a control system showing the input and output sections coupled together by an interface.

FIG. 5 shows schematically a complete system. The H-bars of matrix I are fed by input signals from interface I having inputs adapted to accept both direct and inverted input forms. The V bars of matrix I supply the Q bars of matrix II via an interface II. The J bars of matrix II supply the output lines via interface III.

By physically connecting the contact of an output relay as an input to the system, a relatively complex logical combination of input signals may be used as one component in the generation of another combination. Alternatively, a feed-back connection may be used to provide a latching or maintaining function, e.g. for the control of a motor contactor from start and stop momentary action push-buttons.

However, to minimise external connections, it is convenient to provide a number of internal feed-back connections from outputs to inputs which may be brought into use as desired by programming the matrices. For example, 30% of the number of output channels J may be treated in this way, the corresponding signals being fed to some of the bus-bars H, which are not then used for external inputs.

It is not necessary for such internal feed-back connections to pass through the normal output and input interfaces, but direct connection of a J bar to an H bar is preferably avoided. This is because the response of a latching circuit using such a connection would be unnecessarily rapid, and its state liable to be changed unexpectedly by a short interference pulse.

For this reason, internal feed-back connections are preferably made via circuits which introduce delay. In addition, these circuits may provide both senses of signal, which are taken to separate bus-bars H, to increase the flexibility of the system.

By using circuits having adjustable delay, such feed-back connections may also be used for timing functions.

will be clear that the functions of the horizontal vertical matrix rows may be interchanged, and that positive or negative logic circuits may be used.

However, when using a plug-board, it is preferable to keep the V and Q signals on the columns of both sections, if they are arranged one above the other, or on the rows if side-by-side. Both sections can then be physically mounted together.

In the preferred form of the invention, the V and Q bus-bars are extended in one direction beyond the extreme H or J bar, so that the connections to the inverter circuits may be made directly by plugging into the extended portions of the V and Q bars. This construction is particularly suitable when the circuits are mounted on printed circuit boards which can also carry the required plugs directly.

Examples are now given of circuits which may be used for input and output interfaces, inversion, and feed back connection. These circuits employ NPN transistors, but could be realised with other forms of switching device, or devices of the same or opposite polarity.

Figure 2:
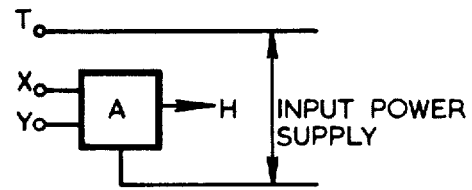
FIG. 2 is a schematic diagram of an input interface suitable for the input section of FIG. 1.
Figure 6:
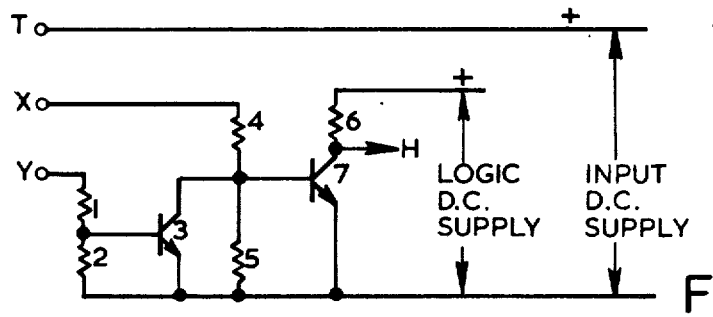
FIG. 6 is a schematic circuit diagram of a suitable input interface.

FIG. 6 shows an input interface channel, corresponding to A of FIG. 2. An input-energising supply is provided at point T. The Figure shows a D.C. supply, suitable for direct connection to X or Y, but an A.C. supply could also be used by interposing rectifiers, etc. This supply voltage is preferably high enough, e.g. 24 volts or more, to minimise switching problems in the input devices connected between T and X or Y.

Assuming firstly no input to Y, transistor 3 is off, and its collector represents substantially an open circuit. With no input to X, transistor 7 is likewise off, and terminal H is high. If now X is raised to the voltage of T, transistor 7 conducts, and H goes low. The values of resistors 4 and 5 are chosen to give ample drive to 7 to drive it into saturation. Resistor 6 determines the current which can be drawn from H in the high state without undue voltage drop. In some applications it is convenient to increase the current capacity by using an emitter-follower between the collector of 7 and the H terminal.

Resistors 1 and 2 are chosen as for 4 and 5, and an input from T to Y will saturate transistor 3, bypassing the base current of transistor 7 and turning it off. Thus for transistor 7 to conduct, there must be an input to X and none to Y, so that the signal at H represents the complement of X. $\overline{Y}$, and is suitable for connection to an H bus-bar of FIG. 1.

Figure 7:
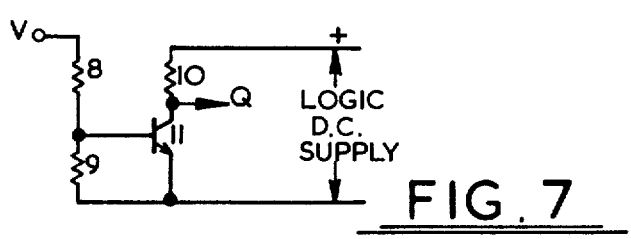
FIG. 7 is a schematic circuit diagram of an inverter channel suitable as an interface element between matrices.

FIG. 7 shows an inverter channel. The input resistors 8 and 9 are selected to give an adequate drive to transistor 11, and to set the on-off transition roughly midway between the high and low voltages at V, in order to minimise the effects of interference and noise. Resistor 10 is selected as for 6 of FIG. 6. Output Q is the inverse of V, and is suitable for connection to a Q bar of FIG. 4.

Figure 8:
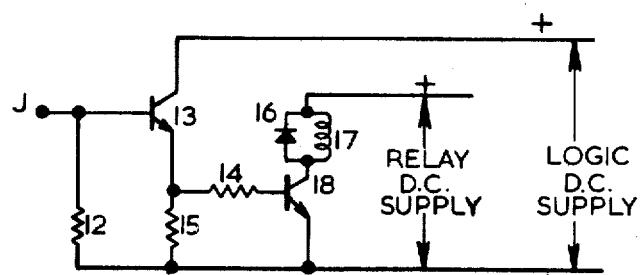
FIG. 8 is a schematic circuit diagram of a relay output channel as an example of an output interface element.

FIG. 8 shows a relay output channel. The relay coil 17 is provided with a reverse diode 16 for suppression, and is driven from a common-emitter stage 18. In turn stage 18 is driven from an emitter-follower stage 13 fed from a J bar of FIG. 4. Resistors 12 and 15 bypass any leakage currents, and resistor 14 limits the base current of stage 18. FIG. 8 thus shows an example of an output interface.

Figure 9:
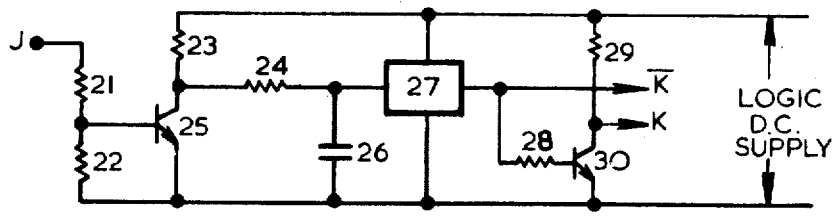
FIG. 9 is a schematic circuit diagram of a feedback connection circuit.

FIG. 9 shows a feed-back connection circuit, also fed from a J bar. The box 27 represents a trigger circuit such as a Schmitt type circuit whose output $\overline{K}$ switches rapidly at pre-determined levels of its input voltage, i.e. that across capacitor 26. This capacitor is charged, via resistors 23 and 24, or discharged, via resistor 24, by switching transistor 25 off or on. The input circuit of 25 is similar to that of FIG. 7.

Suppose J to be low, capacitor 26 charged, and thus $\overline{K}$ high. Then when J switches high, capacitor 26 starts to discharge, but only after a delay will trigger circuit 27 input fall to the value needed to switch $\overline{K}$ low. A similar delay applies after J again switches high. The actual periods of delay are set by the values of capacitor 26 and the resistors 23 and 24 and the switching levels of trigger circuit 27.

In FIG. 9 output $\overline{K}$, subject to the delays referred to, represents the inverse of J. Transistor 30 inverts this signal again to produce the forward output sense. The signals K and $\overline{K}$ are suitable for connection to H bars, so that the logical output J may be used as an input signal, as the logic may require, in either sense.

What is claimed is:

1. In an automatic control system of the type comprising means for realising a set of Boolean relationships, in electrical form, between input and output signals, means for presenting input conditions in electrical form, and means for converting the output signals into mechanical or other required form, the improvements comprising:

a first diode matrix including a bus-bar lattice wherein selected point connections at intersections of the lattice for programming purposes are made by means of diodes, a first interface network of inverters connected to receive said input conditions in electrical form and provide inverted input signals to the inputs of said first diode matrix, a second interface network of inverters connected to receive the outputs of said first diode matrix and provide inverted output signals, and a second diode matrix connected to receive as inputs the outputs of said second interface network and including a bus-bar lattice wherein selected point connections at intersections of the lattice for programming purposes are made by means of diodes, whereby said first diode matrix in combination with said first and second interface networks provides an AND function and said second diode matrix provides an OR function.

2. A system as claimed in claim 1, wherein said first interface network additionally provides direct as well as inverted input signals to said first diode matrix.

3. A system as claimed in claim 2, wherein said first interface network includes circuit means for providing a cross-interlocking function between a plurality of input signals.

4. A system as claimed in claim 1, further comprising feedback means for coupling an output of said second diode matrix as an input to said first diode matrix.

5. A system as claimed in claim 4, wherein said feedback means includes a latch circuit.

6. A system as claimed in claim 4, wherein said feedback means includes a delay circuit.

7. A system as claimed in claim 1, wherein said first and second diode matrices are of plug-board form and diode plug pins are used at selected intersections to effect programming.

8. A system as claimed in claim 1, wherein said first and second diode matrices are constructed with a pair of back-to-back diodes at every intersection and programming is effected by applying an excessive voltage in the desired direction at selected intersections to cause the reverse diode of the pair to break down and leave a uni-directional conduction path at each such selected intersection.

9. A system as claimed in claim 1, wherein to facilitate the signal feed between the input and output sections, the feed bus-bars of said first diode matrix and the feed bus-bars of said second diode matrix are extended in at least one direction beyond the extremes of the respective cross bus-bars, the bus-bar extensions acting as plug-coupling elements.

10. A system as claimed in claim 9, wherein said second interface network plug connects with the bus-bar extensions of both said first and second diode matrices.

11. A system as claimed in claim 1, further comprising a third interface network including at least one relay output channel connected to an output of said second diode matrix, said delay output channel including a relay coil and a solid-state switch connected in series across a source of energizing voltage, said switch being actuated by a signal on said output of said second diode matrix.

12. A system as claimed in claim 4, wherein said feedback means includes a capacitor, means controlled by an output of said second diode matrix for charging and discharging said capacitor, and a Schmitt circuit having its input connected across said capacitor and its output connected to an input of said first diode matrix.

* * * * *